US007334265B1

(12) United States Patent
Morishita

(10) Patent No.: US 7,334,265 B1
(45) Date of Patent: Feb. 19, 2008

(54) SYSTEM AND PROGRAM FOR PREVENTING UNAUTHORIZED COPYING OF SOFTWARE

(75) Inventor: Takuya Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/572,302

(22) Filed: May 18, 2000

(30) Foreign Application Priority Data

May 20, 1999 (JP) ................................. 11-140252

(51) Int. Cl.
  G06F 21/00 (2006.01)
  G06F 21/11 (2006.01)
  G06F 12/14 (2006.01)
(52) U.S. Cl. ........................... 726/26; 726/30; 726/31; 726/32; 713/187; 380/201
(58) Field of Classification Search ................ 713/171
  See application file for complete search history.

(56) References Cited

U.S. PATENT DOCUMENTS

| 4,558,176 | A | * | 12/1985 | Arnold et al. ................. 713/90 |
| 4,796,220 | A | * | 1/1989 | Wolfe ............................ 705/56 |
| 5,058,162 | A | * | 10/1991 | Santon et al. ................. 705/51 |
| 5,410,598 | A | * | 4/1995 | Shear ............................ 705/53 |
| 5,586,186 | A | * | 12/1996 | Yuval et al. .................... 380/30 |
| 6,044,154 | A | * | 3/2000 | Kelly ........................... 713/155 |
| 6,219,788 | B1 | * | 4/2001 | Flavin et al. ................ 713/194 |
| 6,324,650 | B1 | * | 11/2001 | Ogilvie ........................ 713/302 |
| 6,332,025 | B2 | * | 12/2001 | Takahashi et al. .......... 380/281 |
| 6,567,915 | B1 | * | 5/2003 | Guthery ....................... 713/168 |

FOREIGN PATENT DOCUMENTS

| JP | 59-229646 | 12/1984 |
| JP | 4-287124 | 10/1992 |
| JP | 7-287654 | 10/1995 |
| JP | 7-325712 | 12/1995 |
| JP | 8-6784 | 1/1996 |
| JP | 9-244886 | 9/1997 |
| JP | 11-39158 | 2/1999 |
| WO | WO98/42098 | 9/1998 |
| WO | WO99/19822 | 4/1999 |

* cited by examiner

Primary Examiner—Syed A. Zia
(74) Attorney, Agent, or Firm—McGinn IP Law Group, PLLC

(57) ABSTRACT

A system for preventing an unauthorized software copying prevention mechanism from being invalidated by a program falsification, includes an inherent key generator for generating an inherent key peculiar to a software user data processing device, a secret information encrypting unit for encrypting secret information indispensable for software to operate properly, which is stored by a secret information storage unit, with an inherent key, and a falsification detector for inspecting whether the system for preventing unauthorized copying of software, which is operating on the software user data processing device, has been falsified or not. If the system has not been falsified, then the inherent key generator generates the inherent key. If the system has been falsified, then a secret information destroyer destroys the encrypted secret information stored by an encrypted secret information storage unit by erasing the secret information or writing a pseudo-random number into the secret information.

19 Claims, 4 Drawing Sheets

SYSTEM AND PROGRAM FOR PREVENTING UNAUTHORIZED COPYING OF SOFTWARE

BACKGROUND OF THE INVENTION

1. Field of the Invention

The present invention relates to a system for preventing unauthorized copying of software and a program for preventing unauthorized copying of software.

2. Description of the Related Art

One conventional system for preventing unauthorized duplication of software is disclosed in Japanese laid-open patent publication No. 8-6784. FIG. 1 of the accompanying drawings shows the disclosed system for preventing unauthorized duplication of software.

As shown in FIG. 1, a management apparatus 420 sends a product 413 of software/writing which has been processed by a locking/destruction processing means 412 and a key to a user's terminal 410 via a communication link. In the terminal 410, the purchased software or writing is unlocked by an unlocking/reuse processing means 415 using the key, and used. When the expiration date of the software or writing comes, a use control means 411 controls the locking/destruction processing means 412 to automatically lock or destroy the software or writing, which then stops its operation. The user operates a continued use request processing means 414 to request the management apparatus 420 to update user information. In the management apparatus 420, a qualification examining means 422 refers to user information managing means 421 to examine the qualification of the user. If the qualification of the user is accepted, then a right-to-use updating means 423 updates user information in a user information managing means 421, and sends a new software key to the terminal 410. The user receives the new key or product, unlocks the software or writing with the unlocking/reuse processing means 415, and continues to use the purchased software or writing until a next expiration date. The above process is repeated insofar as the user wants to use the software or writing continuously.

However, the above conventional system for preventing unauthorized duplication of software suffers the following problems:

The first problem is that the unauthorized software copying prevention mechanism can be invalidated by falsifying the program. It is the widespread general practice to analyze and falsify the mechanism which determines whether the program is copied or its expiration date has been reached while the program is being executed, and changes its operation depending on the determined result. The conventional system for preventing unauthorized duplication of software has not been protected against such unfair practice.

The second problem is that software-implemented self-destruction of the program can easily be nullified. Specifically, an unauthorized user can nullify such software-implemented self-destruction of the program by copying the program to another medium before the program is self-destroyed, and restoring the program based on the copy after the self-destruction mechanism has been activated.

The third problem is that the conventional system for preventing unauthorized duplication of software is not convenient enough for the user because each time the expiration date comes, the user is required to connect the communication link and receive a new key.

SUMMARY OF THE INVENTION

It is therefore an object of the present invention to provide a system for preventing unauthorized copying of software and a program for preventing unauthorized copying of software, which are capable of preventing an unauthorized software copying prevention mechanism from being invalidated by falsifying the program.

According to the present invention, a system for preventing unauthorized copying of software has a software user data processing device which includes inherent key generating means, inherent key encrypting means, inherent key distributing means, secret information decrypting means, falsification detecting means, and secret information destroying means, and a software supplier data processing device which includes inherent key decrypting means, secret information encrypting means, and secret information distributing means.

The inherent key generating means generates an inherent key peculiar to the software user data processing device. The generated inherent key is encrypted by the inherent key encrypting means, and distributed to the software supplier data processing device by the inherent key distributing means. In the software supplier data processing device, the distributed inherent key is decrypted by the inherent key decrypting means. Secret information indispensable for the software to operate properly, which is stored by secret information storing means, is encrypted by the secret information encrypting means, and distributed by the secret information distributing means to a software user storage device and stored in encrypted secret information storing means.

The falsification detecting means inspects whether the system for preventing unauthorized copying of software, which is operating on the software user data processing device, has been falsified or not. If the system for preventing unauthorized copying of software has not been falsified, then the inherent key generating means generates the inherent key. If the device which is operating is different from the device used for registering the user, then the generated inherent key is different from the inherent key generated for registering the user. In this case, the encrypted secret information stored in the encrypted secret information storing means cannot be decrypted, and subsequent processing cannot be executed properly.

If the system for preventing unauthorized copying of software has been falsified, then the secret information destroying means destroys the secret information stored by the encrypted secret information storing means by erasing the secret information or writing a pseudo-random number into the secret information, so that subsequent processing cannot be executed properly.

The software is prevented from being executed by an unauthorized user on a device different from the device used for registering the authorized user, and an unauthorized software copying prevention mechanism is prevented from being invalidated by falsifying the program, without impairing the convenience of the authorized user.

The above and other objects, features, and advantages of the present invention will become apparent from the following description with reference to the accompanying drawings which illustrate examples of the present invention.

DESCRIPTION OF THE PREFERRED EMBODIMENTS

Figure 2:
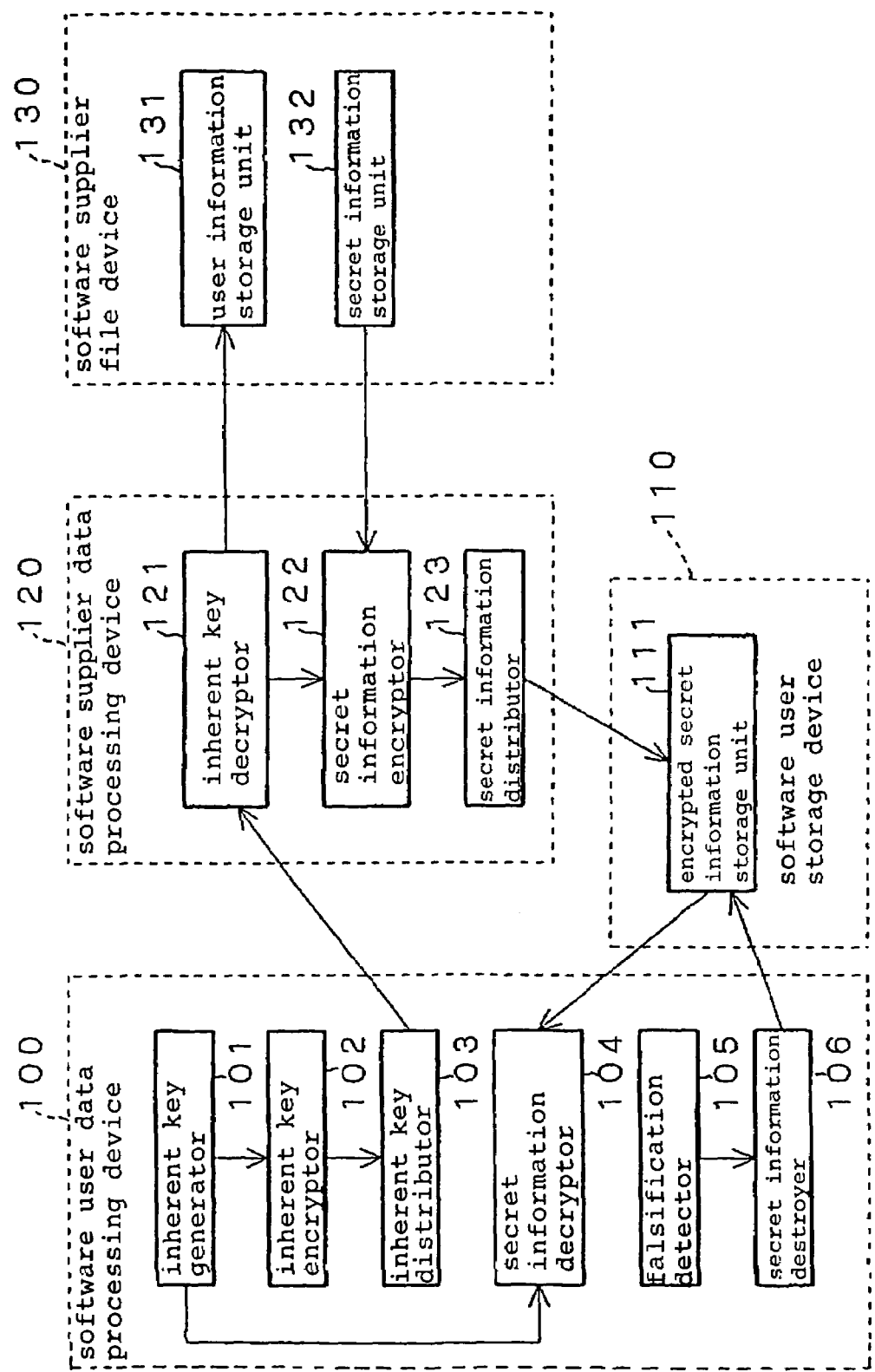
FIG. 2 is a block diagram of a system for preventing unauthorized copying of software according to an embodiment of the present invention.

Referring now to FIG. 2, there is shown a system for preventing unauthorized copying of software according to an embodiment of the present invention that generally comprises a program-controlled software user data processing device 100, a software user storage device 110, a program-controlled software supplier data processing device 120, and a software supplier file device 130.

The software user data processing device 100 has an inherent key generator 101, an inherent key encryptor 102, an inherent key distributor 103, a secret information decryptor 104, a falsification detector 105, and a secret information destroyer 106.

The software user storage device 110 has an encrypted secret information storage unit 111. The encrypted secret information storage unit 111 should preferably be different from a file device which stores ordinary software.

The software supplier data processing device 120 has an inherent key decryptor 121, a secret information encryptor 122, and a secret information distributor 123.

The software supplier file device 130 has a user information storage unit 131 and a secret information storage unit 132.

The inherent key generator 101 generates different inherent keys inherent in different software user data processing devices 100. The inherent key encryptor 102 encrypts the inherent key generated by the inherent key generator 101. The inherent key distributor 103 distributes the inherent key encrypted by the inherent key encryptor 102 to the inherent key decryptor 121 via a communication link. The secret information decryptor 104 decrypts encrypted secret information stored in the encrypted secret information storage unit 111 with the inherent key generated by the inherent key generator 101. The falsification detector 105 inspects whether the system for preventing unauthorized copying of software, which is operated on the software user data processing device 100, has been falsified or not. If the falsification detector 105 detects a system falsification, then the secret information destroyer 106 destroys the encrypted secret information stored in the encrypted secret information storage unit 111. The inherent key decryptor 121 decrypts the encrypted inherent key distributed from the inherent key distributor 103 with a secret key, and stores the decrypted inherent key together with user information in the user information storage unit 131. The secret information encryptor 122 encrypts secret information stored in the secret information storage unit 132 with the inherent key decrypted by the inherent key decryptor 121. The secret information distributor 123 distributes the encrypted secret information to the encrypted secret information storage unit 111 via a communication link.

Figure 3:
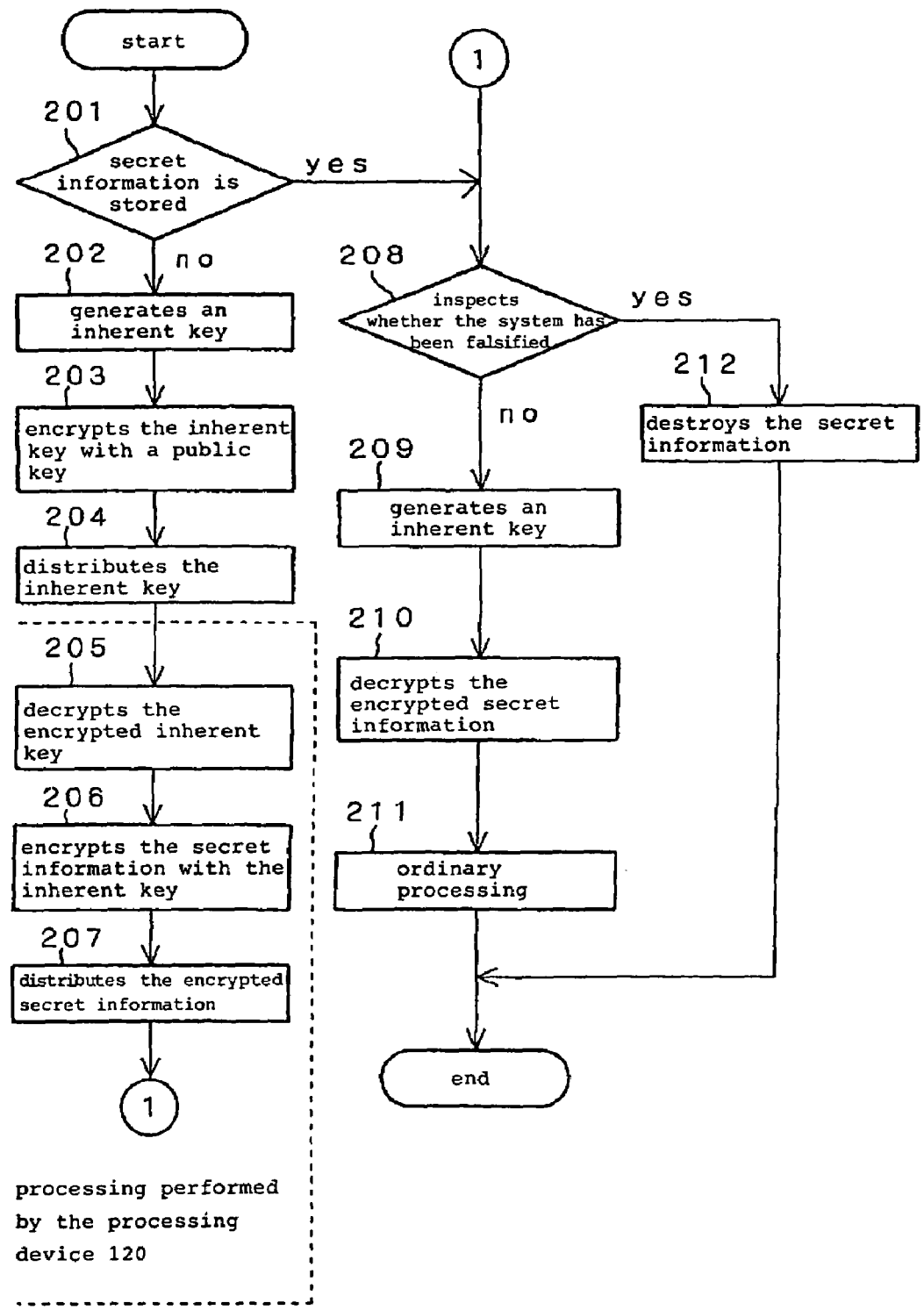
FIG. 3 is a flowchart of an operation sequence of the system for preventing unauthorized copying of software shown in FIG. 2.

Overall operation of the system for preventing unauthorized copying of software will be described below with reference to FIGS. 2 and 3.

The system for preventing unauthorized copying of software generally operates in two modes. One of the modes is a user registration mode, and the other mode is a software operation mode.

The secret information decryptor 104 determines whether secret information is stored in the encrypted secret information storage unit 111 or not in step 201. If secret information is not stored in the encrypted secret information storage unit 111, then user registration is carried out in steps 202 through 207. If secret information is stored in the encrypted secret information storage unit 111, then ordinary processing is executed in steps 208 through 211.

The user registration is carried out only once when sold software is used for the first time. The software is distributed to the user in the form of a CD-ROM or via a communication link, for example. If the software is distributed via a communication link, then it is assumed that the amount of money charged for the software has been paid using an existing electronic commerce system. Reliable user information such as a credit card number obtained in the settlement will be used subsequently in step 205.

The inherent key generator 101 generates an inherent key peculiar to the software user data processing device 100 using serial numbers assigned to the respective units of the software user data processing device 100 in step 202. The inherent key may be a common key according to DES (Data Encryption Standard) or a public key according to RSA, which has been in widespread general use. If a common key is used, then one inherent key is generated. If a public key is used, then a public key for encryption and a secret key for decryption are used as an inherent key.

The inherent key encryptor 102 encrypts the inherent key generated by the inherent key generator 101 in step 203. It is assumed that a public key encryption process is used to encrypt the inherent key, and the inherent key encryptor 102 encrypts the inherent key with a public key. The public key used to encrypt the inherent key is embedded as a fixed value in the inherent key encryptor 102, and the secret key used to decrypt the inherent key is embedded as a fixed value in the inherent key decryptor 121.

The inherent key distributor 103 distributes the inherent key encrypted by the inherent key encryptor 102 to the inherent key decryptor 121 via a communication link in step 204. Even if any third party other than the supplier intercepts the encrypted inherent key, it will find it difficult to obtain and use the inherent key which is not encrypted because the third party does not have the secret key.

The inherent key decryptor 121 decrypts the encrypted inherent key distributed from the inherent key distributor 103 with the secret key in step 205, and stores the decrypted inherent key together with the user information in the user information storage unit 131.

The secret information encryptor 122 encrypts the secret information stored in the secret information storage unit 132 with the inherent key in step 206. The secret information is information that is indispensable for a product of software that performs required processing to operate normally. For example, the secret information comprises a program code (or a part thereof) or an encryption key for authentication or the like. At this time, an inherent key may be added to the secret information, and then the secret information may be encrypted by the inherent key. If an unauthorized copy of the secret information is subsequently distributed, then the added inherent key is checked against the inherent key stored in the user information storage unit 131 in order to identify the user who has made the unauthorized copy of the secret information.

The secret information distributor 123 distributes the encrypted secret information to the encrypted secret information storage unit 111 via a communication link in step 207. The encrypted secret information storage unit 111 may comprise, for example, a storage unit that cannot easily be used by the user, such as a management information storage area of an operating system or a BIOS (Basic Input/Output System) area of hardware. Such a storage unit is used as the encrypted secret information storage unit 111 in order to prevent the user from copying the encrypted secret information to another storage medium.

If secret information is stored in the encrypted secret information storage unit 111 in step 201, then, as described above, ordinary processing is executed in steps 208 through 211.

The falsification detector 105 inspects in step 208 whether the system for preventing unauthorized copying of software, which is operated on the software user data processing device 100, has been falsified or not. If the system for preventing unauthorized copying of software has not been falsified, then control goes to step 209. If the system for preventing unauthorized copying of software has been falsified, then control goes to step 212. The falsification detector 105 uses an electronic signature using a public key encryption process for falsification inspection. If an RSA electronic signature is used, for example, then a hash value of a program code is determined in advance, encrypted with a secret key, and used as a signature. If a system falsification is detected, then the signature is decrypted into the hash value with the public key, and compared with a hash value calculated from the program code.

If no system falsification is detected, then the inherent key generator 101 generates an inherent key in step 209. If the device which is operating is different from the device used for registering the user, then the generated inherent key is different from the inherent key generated in step 202.

The secret information decryptor 104 decrypts the encrypted secret information stored in the encrypted secret information storage unit 111 with the inherent key generated by the inherent key generator 101 in step 210. If the decrypted inherent key differs from the inherent key generated when the user is registered, then the subsequent processing will not be performed properly.

A program executing means (not shown as it is not directly contained in the system for preventing unauthorized copying of software) performs ordinary processing using the decrypted secret information in step 211.

If the system for preventing unauthorized copying of software is falsified, then the secret information destroyer 106 destroys the secret information stored in the encrypted secret information storage unit 111 by erasing the secret information or writing a pseudo-random number into the secret information in step 212. Since the secret information is thus destroyed, the ordinary processing in step 211 cannot be executed properly unless the user registration is carried out again.

Figure 4:
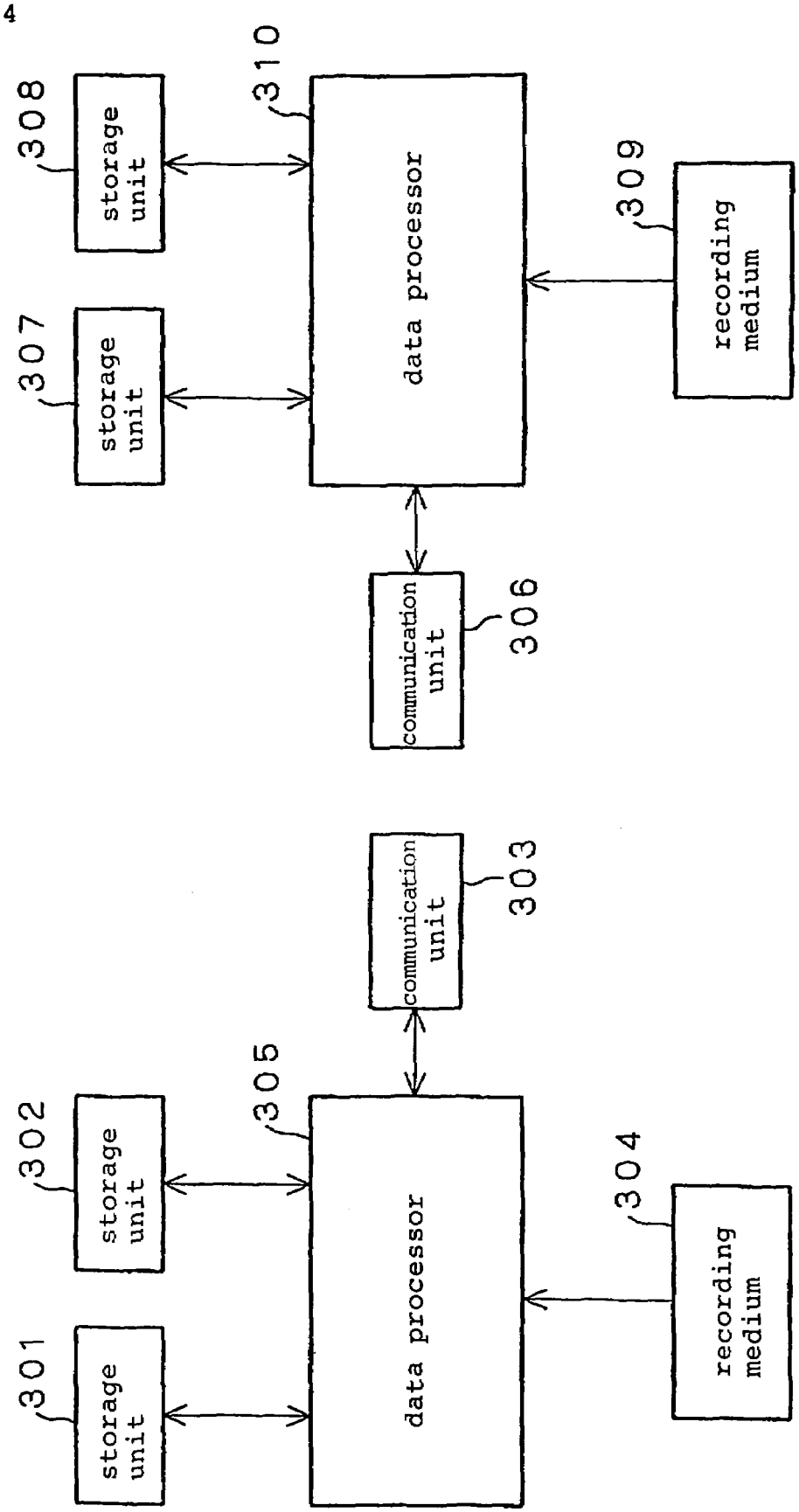
FIG. 4 is a block diagram of a system for preventing unauthorized copying of software according to another embodiment of the present invention.

FIG. 4 show in block form a system for preventing unauthorized copying of software according to another embodiment of the present invention.

Figure 1:
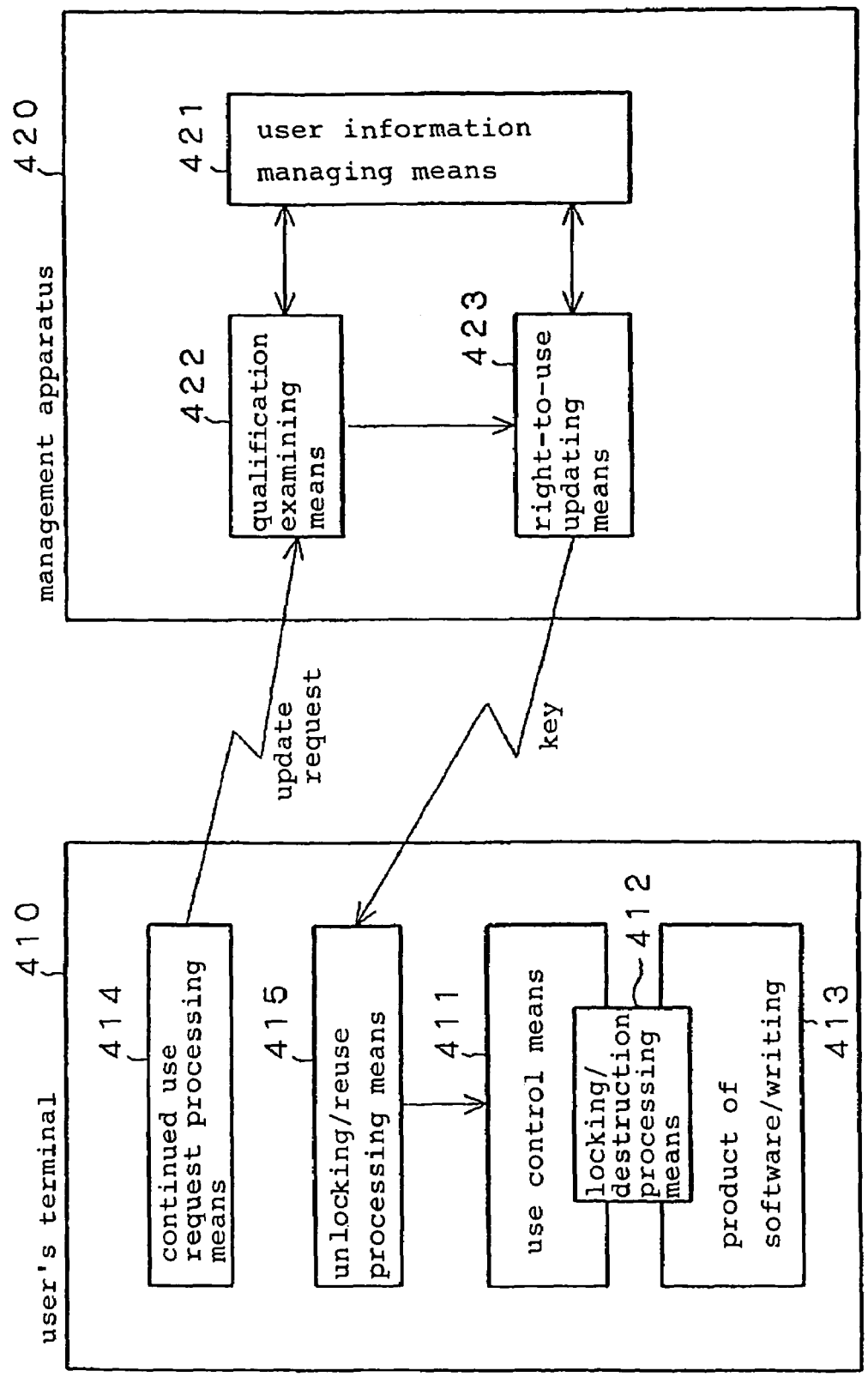
FIG. 1 is a block diagram of a conventional system for preventing unauthorized copying of software.

As shown in FIG. 4, the system for preventing unauthorized copying of software according to the other embodiment of the present invention includes a storage unit 302, a communication unit 303, a recording medium 304, and a data processor 305 which jointly correspond to the software user data processing device 100 shown in FIG. 1, a storage unit 301 which corresponds to the software user storage device 100 shown in FIG. 1, a communication unit 306, a storage unit 308, a recording medium 309, and a data processor 310 which jointly correspond to the software supplier data processing device 120 shown in FIG. 1, and a storage unit 307 which corresponds to the software supplier file device 130 shown in FIG. 1. The storage units 302, 308 comprise main storage units. The communication units 303, 306 serve to perform communications between the software user storage device 100 and the software supplier data processing device 120. Each of the recording mediums 304, 309 may comprise a FD (Floppy Disk), a DVD-ROM, a CD-ROM, an MO (MagnetoOptical) disk, or the like. The recording medium 304 stores the program for preventing unauthorized copying of software ranging from the inherent key generator 101 to the secret information destroyer 106, and the recording medium 309 stores the program for preventing unauthorized copying of software ranging from the inherent key decryptor 121 to the secret information distributor 123. The data processors 305, 310 comprise CPUs for reading the program for preventing unauthorized copying of software from the respective recording mediums 304, 309 and executing the read program.

While preferred embodiments of the present invention have been described using specific terms, such description is for illustrative purposes only, and it is to be understood that changes and variations may be made without departing from the spirit or scope of the following claims.

What is claimed is:

1. A system for preventing unauthorized copying of software, comprising:
   a software user data processing device;
   a software supplier data processing device; and
   a user storage device having encrypted secret information storing means for storing encrypted secret information;
   said software user data processing device comprising:
      inherent key generating means for generating an inherent key peculiar to the software user data processing device,
      inherent key encrypting means for encrypting the inherent key,
      inherent key distributing means for distributing the encrypted inherent key to said software supplier data processing device,
      secret information decrypting means for decrypting secret information indispensable for the software to operate properly, which is stored by said encrypted secret information storing means, with said inherent key,
      falsification detecting means for inspecting whether the system for preventing unauthorized copying of software has been falsified or not, and
      secret information destroying means for destroying the secret information stored by said encrypted secret information storing means if the system for preventing unauthorized copying of said software has been falsified; and
   said software supplier data processing device comprising:
      inherent key decrypting means for decrypting the encrypted inherent key distributed from said software user data processing device,
      secret information storing means for storing the secret information,
      secret information encrypting means for encrypting the secret information stored by said secret information storing means with the decrypted inherent key, and secret information distributing means for distributing the encrypted secret information to said software user data processing device and storing the encrypted secret information storing means.

2. A system according to claim 1, further comprising a file device for storing the software, said user storage device being different from said file device.

3. A system according to claim 1 or 2, wherein an inherent key for identifying the software user data processing device is added to said secret information.

4. A program executable by a computer in a software supplier data processing device responsive to a program executable by a computer in a software user data processing device, for performing a method of preventing unauthorized copying of software, said method performed by said computer in said software user data processing device comprising:
generating an inherent key peculiar to the software user data processing device;
encrypting the inherent key;
distributing the encrypted inherent key to a software supplier data processing device;
decrypting secret information indispensable for the software to operate properly, which is stored by an encrypted secret information storing means;
inspecting whether the program for preventing unauthorized copying of software has been falsified or not; and
destroying the secret information stored by said encrypted secret information storing means if the program for preventing unauthorized copying of software has been falsified, said method performed by said computer in said software supplier data processing device comprising:
decrypting the encrypted inherent key distributed in said distributing the encrypted inherent key in the program executable by said computer in said software user data processing device;
encrypting the secret information stored by the secret information storing means with the decrypted inherent key; and
distributing the encrypted secret information to the software user data processing device and storing the encrypted secret information in the encrypted secret information storing means.

5. A program executable by a computer in a software user data processing device, for performing a method of preventing unauthorized copying of software, said method comprising:
generating an inherent key peculiar to the software user data processing device;
encrypting the inherent key;
distributing the encrypted inherent key to a software supplier data processing device;
decrypting secret information indispensable for the software to operate properly, which is stored by an encrypted secret information storing means;
inspecting whether the program for preventing unauthorized copying of software has been falsified or not; and
destroying the secret information stored by said encrypted secret information storing means if the program for preventing unauthorized copying of software has been falsified,
wherein an inherent key for identifying the software user data processing device is added to said secret information.

6. The system according to claim 1, wherein said secret information comprises an inherent key for identifying the software user data processing device.

7. A program executable by a computer in a software user data processing device, for performing a method of preventing unauthorized copying of software, said method comprising:
generating an inherent key peculiar to the software user data processing device;
encrypting the inherent key;
distributing the encrypted inherent key to a software supplier data processing device;
decrypting secret information indispensable for the software to operate properly, which is stored by an encrypted secret information storing means;
inspecting whether the program for preventing unauthorized copying of software has been falsified or not; and
destroying the secret information stored by said encrypted secret information storing means if the program for preventing unauthorized copying of software has been falsified,
wherein said secret information comprises an inherent key for identifying the software user data processing device.

8. The system according to claim 1, wherein, if the falsification detecting means determines that the system has not been falsified, the inherent key generating means generates the inherent key.

9. The system according to claim 1, wherein, if the user data processing device is determined to be different from a user data processing device used for registering the software, a generated inherent key is different from an inherent key generated for registering the software.

10. The system according to claim 9, wherein the generated inherent key being different from the inherent key generated for registering the software prevents the encrypted secret information stored in the encrypted secret information storing means from being decrypted, thereby preventing proper execution of subsequent processing.

11. The system according to claim 1, wherein, if the falsification detecting means determines that the system has been falsified, the secret information destroying means destroys the secret information stored by the encrypted secret information storing means, whereby subsequent processing of the software cannot be executed properly.

12. The system according to claim 11, wherein the secret information destroying means destroys the secret information by at least one of erasing the secret information and writing a pseudo-random number into the secret information.

13. A program executable by a computer in a software user data processing device, for performing a method of preventing unauthorized copying of software, said method comprising:
generating an inherent key peculiar to the software user data processing device;
encrypting the inherent key;
distributing the encrypted inherent key to a software supplier data processing device;
decrypting secret information indispensable for the software to operate properly, which is stored by an encrypted secret information storing means;
inspecting whether the program for preventing unauthorized copying of software has been falsified or not; and destroying the secret information stored by said encrypted secret information storing means if the program for preventing unauthorized copying of software has been falsified, wherein generating the inherent key is performed if the system has not been falsified.

14. A method for preventing unauthorized copying of software, comprising:

generating an inherent key peculiar to a user data processing device;

encrypting the inherent key;

distributing the encrypted inherent key to a supplier data processing device;

decrypting secret information indispensable for the software to operate properly, which is stored by an encrypted secret information storing means;

determining if any of the generating, encrypting, and decrypting has been falsified;

destroying the secret information stored by said encrypted secret information storing means if any of the generating, encrypting, and decrypting has been falsified;

decrypting the encrypted inherent key distributed from the user data processing device; encrypting secret information stored by the secret information storing means with the decrypted inherent key; and distributing the encrypted secret information to the software user data processing device and storing the encrypted secret information in the secret information storing means.

15. The system according to claim 1, wherein the user storage device comprises a management information storage unit of an operating system.

16. The system according to claim 1, wherein the user storage device comprises a basic input/output system (BIOS) unit of a hardware device.

17. The system according to claim 1, wherein the user storage device comprises a storage unit having restricted access, thereby preventing the encrypted secret information from being copied to another storage medium.

18. A method for preventing unauthorized copying of software, comprising:

determining if encrypted secret information is stored in a storage unit;

determining if the encrypted secret information has been falsified;

generating an inherent key, which is peculiar to a software user data processing device, if the encrypted secret information has not been falsified;

decrypting the encrypted secret information;

performing processing of the software; and destroying the encrypted secret information if the secret information has been falsified.

19. A program executable by a computer in a software user data processing device, for performing a method of preventing unauthorized copying of software, said method comprising:

generating an inherent key peculiar to the software user data processing device;

encrypting the inherent key;

distributing the encrypted inherent key to a software supplier data processing device;

decrypting secret information indispensable for the software to operate properly, which is stored by an encrypted secret information storing means;

inspecting whether the program for preventing unauthorized copying of software has been falsified or not;

destroying the secret information stored by said encrypted secret information storing means if the program for preventing unauthorized copying of software has been falsified; and decrypting the encrypted inherent key distributed from said software user data processing device in a program executable by a computer in a software supplier data processing device.

\* \* \* \* \*